United States Patent [19]
Amundson

[11] 3,815,275
[45] June 11, 1974

[54] LURE WITH MULTI-PURPOSE DIVING VANE

[76] Inventor: Gerald J. Amundson, 312 E. Union St., Punxsutawney, Pa. 15767

[22] Filed: May 2, 1973

[21] Appl. No.: 356,284

[52] U.S. Cl. .............................. 43/42.22, 43/42.47
[51] Int. Cl. ............................................. A01k 85/00
[58] Field of Search ............ 43/42.22, 42.23, 42.03, 43/42.47, 42.09

[56] References Cited
UNITED STATES PATENTS
2,495,134   1/1950   Roberts ............................... 43/42.22
2,723,483   11/1955  Jepson ................................ 43/42.22
3,388,495   6/1968   Minser ................................ 43/42.09

Primary Examiner—Warner H. Camp
Attorney, Agent, or Firm—Clarence A. O'Brien; Harvey B. Jacobson

[57] ABSTRACT

A fish lure body is provided having front and rear ends and a hook supported from the body rearward of the front end thereof. The forward end of the body includes diving fin structure releasably supportable from the body in each of four different positions, the diving fin structure being of a configuration to act upon the water through which the lure is pulled in a different manner in each of the four different positions of the diving fin structure.

10 Claims, 10 Drawing Figures

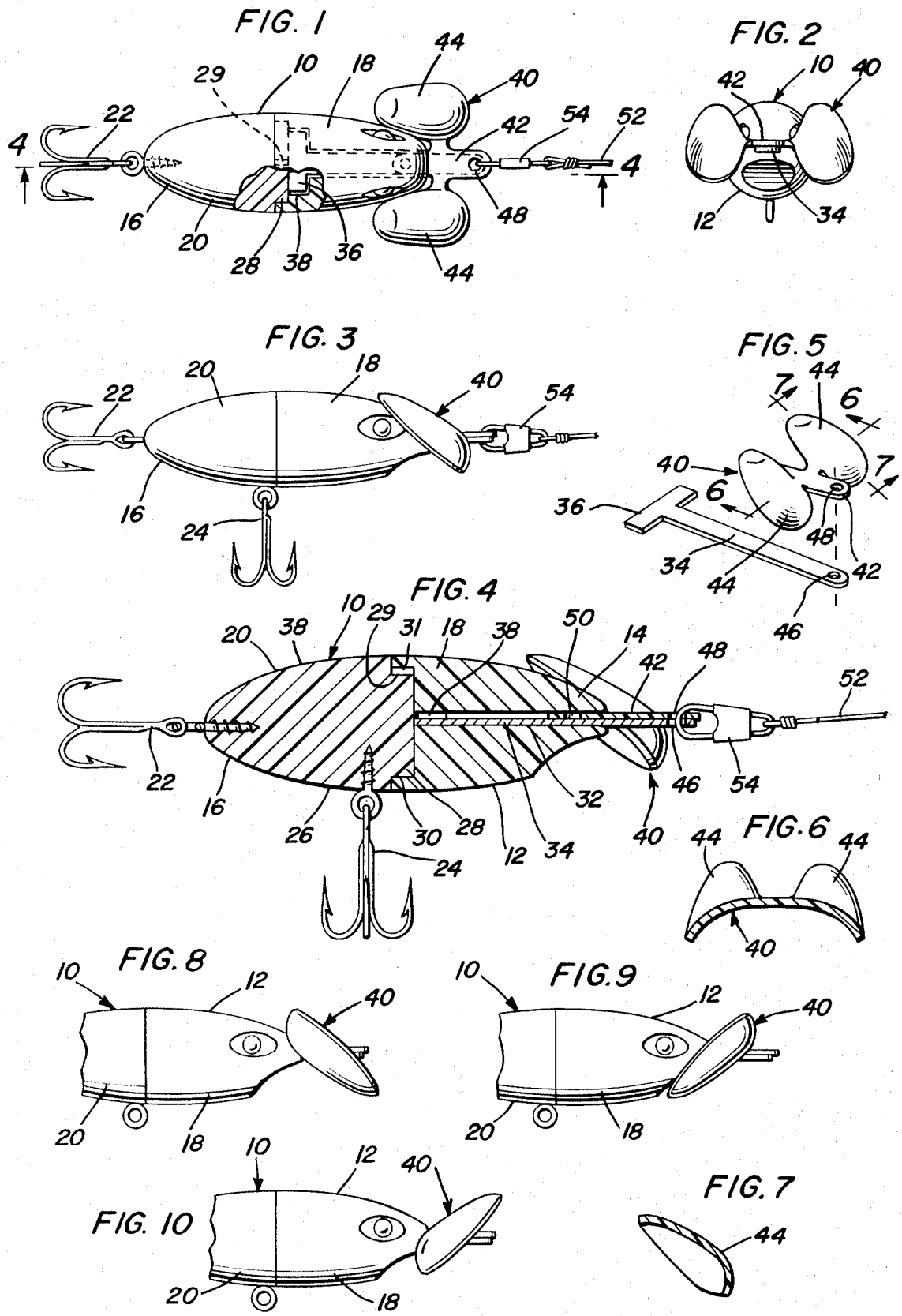

LURE WITH MULTI-PURPOSE DIVING VANE

The lure of the instant invention has been designed to enable a fisherman, by purchasing a single lure, to fish in four different modes. The lure may be quickly adjusted to (1) dive deep, (2) skip on the surface of the water, (3) dive shallow and (4) turn on the surface of the water in a manner similar to "jitter bugging." Still further, the aforementioned modes of fishing are accomplished by selective positioning of a diving fin structure at the front end of the plug body and a fifth mode of fishing may be accomplished merely be removing the diving fin structure whereupon the lure will act as a conventional floating lure.

While there have been multi-mode fishing lures heretofore designed and provided with selectively positionable fin structure such as that disclosed in U.S. Pat. No. 2,651,876, these selectively positionable diving fins are required to be supported from the associated lure bodies by means of various types of fasteners rendering removal of the diving fin structure either impossible or requiring the use of various tools.

However, the fish lure of the instant invention includes multi-positionable diving fin structure which is supported from the associated lure body without the use of fastening means and the diving fin structure is secured in adjusted position merely through the use of a standard snap connector provided on fishing line leaders by which the lure itself is connected to the leader. Furthermore, the lure of the instant invention also enables complete removal of its diving fin structure while still enabling securement of the lure to a fishing line leader by the standard snap connector provided on the leader.

The main object of this invention is to provide a multi-action lure including fin structure which may be selectively positioned in four different positions relative to the associated lure body in order to impart different movement to the lure as the lure is pulled over or through a body of water.

Another object of this invention, in accordance with the immediately preceding object, is to provide a fishing lure having a completely removable fin structure whereby the lure may also be transformed into a standard floating lure, if desired.

Another important object of this invention is to provide a fishing lure having removable and multi-positionable fin structure that may be removed from the lure body or changed in position relative to the lure body without the use of tools and in a minimum of time.

A still further object of this invention is to provide a fishing lure that may be readily constructed by conventional manufacturing processes.

A final object of this invention to be specifically enumerated herein is to provide a fishing lure which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a top plan view of a lure constructed in accordance with the present invention with portions of the lure being broken away and illustrated in horizontal section;

FIG. 2 is a front elevational view of the lure illustrated in FIG. 1;

FIG. 3 is a side elevational view of the lure illustrated in FIGS. 1-3;

FIG. 4 is an enlarged longitudinal vertical sectional view taken substantially upon the plane indicated by the section line 4—4 of FIG. 1;

FIG. 5 is an exploded perspective view of the attaching shank and multi-positionable diving fin structure of the lure;

FIG. 6 is an enlarged vertical sectional view taken substantially upon the plane indicated by the section line 6—6 of FIG. 5;

FIG. 7 is an enlarged vertical sectional view taken substantially upon the plane indicated by the section line 7—7 of FIG. 5;

FIG. 8 is a fragmentary side elevational view of the lure with the fin structure illustrated in a position rotated 180° about a horizontal transverse axis relative to the position of the fin structure illustrated in FIG. 3;

FIG. 9 is a fragmentary side elevational view similar to FIG. 8 but with the fin structure illustrated in a position rotated 180° about a longitudinal axis relative to the position of the fin structure illustrated in FIG. 3; and FIG. 10 is yet another fragmentary side elevational view of the lure illustrating the fin structure illustrated in a position rotated 180° about a longitudinal axis relative to the position of the fin structure illustrated in FIG. 8.

Referring now more specifically to the drawings, the numeral 10 generally designates a lure constructed in accordance with the present invention. The lure 10 includes a generally cylindrical body 12 having rounded front and rear ends 14 and 16. The body 12 includes front and rear sections 18 and 20 and it may be seen that a treble hook 22 is supported from the rear terminal end of the rear section 20 and that a second treble hook 24 is supported from the underside portion of the forward end of the rear section 20.

The forward end 26 of the rear section 20 includes a cylindrical projection 28 including a keyway 29 and the rear end of the front section 18 includes a cylindrical recess 30 including a key 31 in which the projection 28 is snugly and seatingly received. The front and rear sections 18 and 20 are cemented together in any convenient manner and the front section 18 includes a longitudinal passage 32 extending therethrough.

An elongated shank 34 extends through the passage 32 and includes a transversely enlarged head 36 on its rear end which is received in laterally enlarged rear end portion 38 of the passage 32. With the shank 34 first being forwardly inserted through the passage 32 and the rear section 20 being subsequently joined to the front section 18, the shank 34 is securely anchored to the body 12. However, it will be noted that while the passage 32 is of substantially the same width as the shank 34, the height of the passage 32 is approximately double the thickness of the shank 34. Thus, the portion of the passage 32 disposed immediately above the shank 34 in FIG. 4 defines a forwardly opening recess opening outwardly of the forward terminal end of the front section 18 of the body 12.

A diving fin structure is referred to in general by the reference numeral 40 and includes an elongated center stem 42 and opposite inclined and cupped fins 44 disposed intermediate the front and rear ends of the stem 42. The forward end of the shank 34 is provided with an upstanding aperture 46 and the opposite ends of the stem 42 are provided with upstanding apertures 48 and 50.

The diving fin structure is preferably constructed of a shape retentive transparent material such as "Lexan," although other materials may be utilized in the construction of the diving fin structure 40, if desired. However, when transparent "Lexan" is used in the construction of the diving fin structure 40, it may be readily manufactured at a low cost by molding processes and the diving fin structure 40 becomes substantially transparent when submerged in the water.

With attention now invited more specifically to FIG. 4 of the drawings, it may be seen that the diving fin structure may be positioned such that its stem 42 overlies and extends along the forward end of the shank 34 with one end of the stem 42 superimposed over the forward end of the shank 34 and the other end of the stem 42 displaced rearwardly into the forward end of the outwardly opening recess defined by the portion of the passage 32 above the shank 34.

A fishing line leader is referred to by the reference numeral 52 and has a conventional snap connector 54 secured to its rear end. With the diving fin structure 40 positioned as illustrated in FIG. 4 of the drawings, the fin structure 40 may be secured in position by engaging the conventional snap connector through the aperture 48 formed in the stem 42 and the aperture 46 formed in the forward end of the shank 34. Thus, longitudinal and lateral shifting of the forward end of the shank 42 is prevented and the rear end of the shank 42 is held captive in the forwardly opening recess defined by the upper portion of the forward end of the passage 32.

With the fin structure 40 positioned as illustrated in FIG. 4 of the drawings, the lure 10 will dive deep when pulled through the water. However, with attention now invited more specifically to FIG. 8 of the drawings, it may be appreciated, with reference also back to FIG. 4, that the snap connector 54 may be removed and the diving fin structure 40 may be displaced forwardly sufficient to withdraw the rear end of the stem 42 outwardly of the forward end of the passage 32. Then, the diving fin structure may be rotated 180° about a horizontal transverse axis and again shifted rearwardly so as to insert the then rear end of the stem 42 into the forward end of the passage 32 so that the aperture 50 formed in the stem 42 may be registered with the aperture 46 in the shank 34 prior to again applying the snap connector 54. With the diving fin structure thus rotated and positioned as illustrated in FIG. 8 of the drawings, the lure 10 will dive shallow with some oscillating action when pulled through the water.

From a comparison of FIGS. 4 and 9 of the drawings it may also be seen that the diving fin structure 40 may be removed and rotated 180° about a front-to-rear extending axis and then reapplied to the lure 10 in the manner illustrated in FIG. 9. When the diving fin structure 40 is positioned as illustrated in FIG. 9, the lure 10 will hydroplane and skip along the surface of the water when pulled.

Still further, by a comparison of FIG. 8 and 10 it will be observed that the diving fin structure 40 may be released from the position illustrated in FIG. 8 and rotated 180° about its longitudinal axis and again applied to the plug in the position illustrated in FIG. 10. With the diving fin structure 40 positioned as illustrated in FIG. 10, the lure 10 will churn over the surface of the water and include a "jitter bug" action.

Finally, it may also be appreciated from FIG. 4 of the drawings that the diving fin structure 40 may be completely removed after which the snap connector 54 may be engaged only with the forward end of the shank 34. In this mode of operation the lure 10 has the action of a conventional fishing lure.

As may be seen from FIGS. 6 and 7 of the drawings the fins 44 are cupped in both longitudinally extending planes and transverse planes. Also, it will be appreciated that the fin structure of the instant invention may be readily incorporated into substantially all types of plugs and lures.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fish lure comprising an elongated body including front and rear ends and hook means supported from the body rearward of the front end thereof, an elongated shank supported from said body and projecting forwardly of the front end thereof, said body including outwardly opening recess means on its forward end portion, and water fin means including a stem having first and second ends and an angled fin intermediate its opposite ends, the first end of said stem and the front end of said shank including coacting means operative to receive fastener means in selected predetermined rotated positions of said stem relative to said shank, fastener means releasably engageable with said coacting means, and the second end of said stem including means seatingly receivable in said recess means in each of said predetermined rotated positions of said stem, said fastener means and the engagement of the second end of said stem in said recess means being operative to retain said diving means in the selected predetermined position thereof.

2. The combination of claim 1 wherein the second end of said stem also includes means operative to receive said fastener in selected predetermined rotated positions of said stem relative to said shank, said first end of said stem also being receivable in said recess means in each of said predetermined rotated positions of said stem.

3. The combination of claim 2 wherein said recess opens endwise outwardly of the forward end of said body alongside said shank, said stem being longitudinally straight and endwise reversible in said recess with the end of said stem projecting outwardly of said recess disposed alongside said shank.

4. The combination of claim 3 wherein the opposite ends of said stem include transverse bores, the forward end of said shank having a transverse bore forward therethrough with which the bores in the opposite ends of said stem are selectively registrable, said fastener being secured through said shank bore and the stem bore registered therewith.

5. A fish lure comprising an elongated body including front and rear ends and hook means supported from said body rearward of the front end thereof, diving fin means including a stem having first and second ends and an angled fin intermediate its opposite ends, said body and stem including support means operative to selectively releasably support said stem from the forward end of said body in selected end-to-end reverse position and also in relatively rotated positions of said stem about its longitudinal axis in each of the end-to-end reversed positions of said stem.

6. The combinations of claim 5 wherein said support means includes a forwardly projecting shank carried by the front end of said body and transverse apertures formed in the opposite ends of said stem as well as a transverse aperture formed in the forward end of said shank with which each of the stem apertures is registrable in one hundred and eighty degree relatively angularly displaced positions of the stem about its longitudinal axis.

7. A fish lure comprising an elongated body including front and rear ends and hook means supported from said body rearward of the front end thereof, said body including a forwardly projecting shank and defining a forwardly opening recess disposed alongside said shank, an elongated stem positionable alongside said shank in selected one hundred and eighty degree angularly displaced positions of said stem about its longitudinal axis and also reversed end-to-end positions of said stem, the opposite ends of said stem including transverse apertures and the forward end of said shank including a transverse aperture with which the forwardmost stem aperture is registrable, and the rear end of said stem being receivable in said recess, said stem including angled water fin means intermediate its opposite ends, said fin means being of a configuration and disposed at such an angle relative to said stem to act upon water through which said lure is pulled in a different manner in each end-to-end reversed position of said stem and in each rotated position of said stem.

8. The combination of claim 7 wherein said body includes front and rear end sections joined together in end abutted relation, one of the adjacent ends of said sections including a recess opening endwise outwardly toward the other section and the latter including an outward projection snugly received in said recess.

9. The combination of claim 8 wherein said front end section includes a passage extending longitudinally therethrough, said shank being secured in said passage with one side of said passage defining said recess.

10. The combination of claim 9 wherein the rear end of said shank includes a lateral extension, the rear end of said front section including a relieved area in which said lateral extension is received.

* * * * *